United States Patent [19]
Clay, Sr.

[11] Patent Number: 5,603,597
[45] Date of Patent: Feb. 18, 1997

[54] ROUND HAY BALE LIFTER AND TRANSPORT DEVICE

[75] Inventor: Carl R. Clay, Sr., Charleston, W. Va.

[73] Assignee: Sandra K. Clay, Charleston, W. Va.; a part interest

[21] Appl. No.: 647,626

[22] Filed: May 15, 1996

[51] Int. Cl.$^6$ ..................................................... B60P 3/00
[52] U.S. Cl. ........................................ 414/24.5; 224/521
[58] Field of Search ................................. 224/519, 521; 414/24.5, 24.6, 551; 403/44; 254/98, 102, 103

[56] References Cited

U.S. PATENT DOCUMENTS

| | | | |
|---|---|---|---|
| 310,767 | 1/1885 | Wilson | 403/44 X |
| 3,731,951 | 5/1973 | Grvenberger | 403/44 X |
| 3,944,095 | 3/1976 | Brown . | |
| 4,015,737 | 4/1977 | Wright et al. . | |
| 4,015,739 | 4/1977 | Cox . | |
| 4,027,773 | 6/1977 | Kenworthy . | |
| 4,099,629 | 7/1978 | Cox . | |
| 4,100,875 | 7/1978 | Patterson, III et al. | 403/44 X |
| 4,179,034 | 12/1979 | Van Antwerp et al. | 414/551 |
| 4,299,522 | 11/1981 | Barton et al. | 414/24.5 |
| 4,329,103 | 5/1982 | Miller | 414/24.5 |
| 4,412,768 | 11/1983 | Bauer et al. | 414/24.5 |
| 4,674,786 | 6/1987 | Lynch | 294/120 |
| 4,674,933 | 6/1987 | Brown | 414/24.6 |
| 5,150,999 | 9/1992 | Dugan | 414/24.5 |
| 5,178,505 | 1/1993 | Smith | 414/24.5 |
| 5,290,133 | 3/1994 | Riley | 414/24.5 |
| 5,372,287 | 12/1994 | Deguevara | 224/521 X |
| 5,540,537 | 7/1996 | Welch | 224/521 X |

Primary Examiner—Karen B. Merritt
Assistant Examiner—Janice L. Krizek
Attorney, Agent, or Firm—Jacobson, Price, Holman & Stern, PLLC

[57] ABSTRACT

A one man round hay bale lifter and transport device is disclosed for quick assembly and disassembly to a conventional trailer hitch mounted on a pick-up truck. The lifting and transport device includes an anchoring structure and a hay bale lifting and holding structure pivotally mounted on the anchoring structure. The rearward end of the anchoring structure includes a square tube for quick assembly with the square tube of the conventional trailer hitch. A ratchet binder is pivotally mounted on the anchoring structure at one end and on the hay bale lifting structure on the other end. By manually rotating the ratchet handle mounted on a threaded sleeve of the ratchet binder, the lifting structure is elevatable to a maximum angle of about 45° with respect to the anchoring structure. A stop bar engages an edge of the anchoring structure to limit further elevation or lowering of the lifting structure. The lifting structure includes at its front end a pronged fork assembly for engaging and lifting the hay bale upon elevation of the lifting structure. Once a hay bale is elevated, the truck is driven to transport the hay bale to a desired location where the operation is reversed to drop off the transported hay bale.

18 Claims, 3 Drawing Sheets

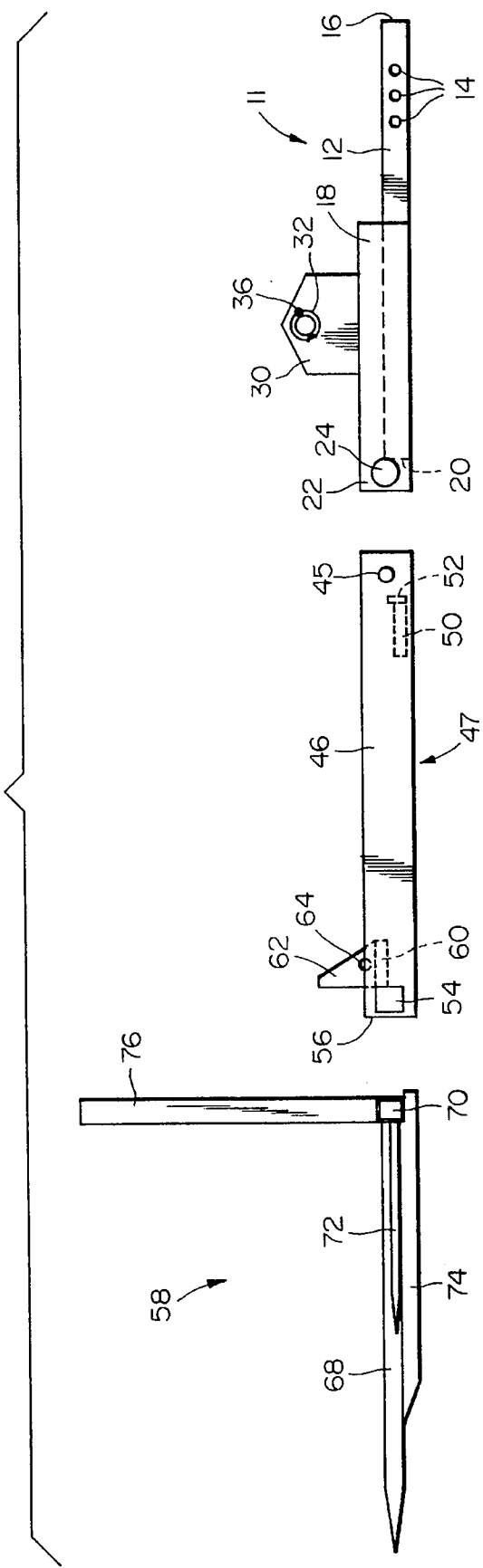
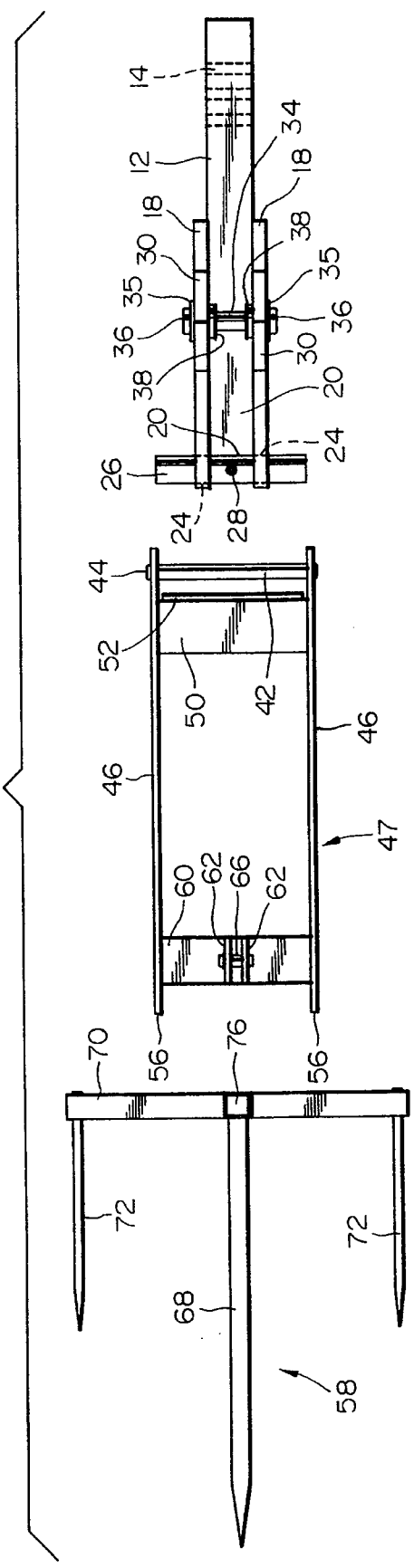
FIG. 3
FIG. 4

5,603,597

ROUND HAY BALE LIFTER AND TRANSPORT DEVICE

FIELD OF THE INVENTION

The present invention relates to a device which can be attached to a truck and can be used to lift a bale of hay, preferably a round bale of hay, and transport the bale of hay by the movement of the truck.

BACKGROUND OF THE INVENTION

Past developments in farming have increased the use of relatively large rolled bales of forage crops, such as hay. These round bales normally weigh between 800 and 1,500 pounds, and typically measure 4 to 5 feet in diameter and are 4 to 5 feet long. In some circumstances, the bales can weigh as much as 2,000 pounds or more and measure 6 feet in diameter and 5 to 7 feet in length. Therefore, the handling of hay in the form of round bales presents problems in moving the bales around from one location to another, such as for storage, feeding purposes and the like. The problems are exacerbated where a single person seeks to move the bales using a vehicle without hydraulic or auxiliary motor power, such as a conventional pick-up truck or similar vehicle equipped only with a standard trailer hitch.

Material handling forklift vehicles are well known, and there are numerous patents disclosing devices designed for manipulating and transporting the large round bales of forage crops, such as hay. For example, forklift devices have been devised for attachment to the hydraulic hitches of agricultural tractors and these devices have proven to be quite satisfactory for transporting bales for short distances. When it is desired to transport such bales over longer distances, tractors are not very practical because they do not travel at normal highway speeds. Consequently, various devices have been devised for lifting the large bales onto truck beds and the like for transporting to the final destination. For example, the following U.S. patents. disclose forklift and other type mechanisms for attachment to agricultural tractors and heavy trucks while utilizing the hydraulic systems to lift the bales from the ground: U.S. Pat. Nos. 4,015,737, 4,015,739, 4,027,773, 4,099,629, 4,299,522, 4,674,933, 5,150,999, 5,178,505 and 5,290,133.

In addition, Bauer U.S. Pat. No. 4,412,768 discloses a hay tote having a specially designed hydraulically actuated truck bumper mounted on a conventional pick-up truck, with two rigid bumper sections and a rotatable center section having a pair of sockets for receiving bale piercing spears. Once the bale is loaded onto the spears, the hydraulic cylinder actuates the rotating part of the bumper to lift the bale. A similar hydraulically operated forklift type attachment for impaling, lifting and carrying large round hay bales is also disclosed in Lynch U.S. Pat. No. 4,674,786.

Thus, the prior lifting mechanisms either require additional manpower or connection to an auxiliary hydraulic or electric motor system, such as found on an agricultural tractor or the like. As such, these prior lifting and transporting mechanisms are not suitable for use by a single operator or on a conventional pick-up truck or the like, which does not have auxiliary hydraulic capability. Further, the prior art lifting and transporting mechanisms are all generally designed for permanent mounting on the tractor or other vehicle, and none contemplate a lifting and transporting assembly which can be quickly connected and disconnected from a conventional vehicle such as a truck or the like.

SUMMARY OF THE INVENTION

In contrast to the prior art devices, the round hay bale lifter and transport device of the present invention is capable of being quickly attached to, and detached from, a standard trailer hitch, such as a square-type or REESE trailer hitch, for example, which in turn is mounted on the frame of any conventional pick-up truck, or the like. The attachment is achieved by inserting a square tube of the anchoring structure of the lifter and transport device into the trailer hitch and then securing the square tube to the hitch. Once the lifter and transport device has been securely attached to the trailer hitch, the truck is moved towards the bale of hay to be lifted and transported. Normally, the hitch and the device of the present invention are attached to the rear of the truck, and the truck is backed up.

Pivotally mounted on the forward end of the anchoring structure, opposite to the attachment to the hitch, is a lifting structure which impales the hay bale for lifting and transport. More specifically, a middle spike or spearing bar and two shorter side stabilizing spikes are mounted on a generally horizontal frame support positioned at the forward end of the lifting structure. As the truck is backed up, the middle spike penetrates the round bale first, preferably through one of its flat sides and along its central axis. A ratchet binder pivotally mounted between the anchoring structure and the lifting structure is then manually rotated to lift the bale into an inclined angle for transport.

During the lifting operation, the bale is further impaled on the middle spearing bar and the two stabilizing spikes. As the bale is further raised to an angle of approximately 45° by using the ratchet binder, the bale is further secured by gravity against the generally horizontal frame support and a generally vertical support bar extending upwardly from the horizontal support bar adjacent the middle spike.

Accordingly, it is an object of the present invention to provide a simple, easy and inexpensive hay bale lifting and transporting device for attachment to a conventional vehicle to effectively transport cumbersome round hay bales.

It is a further object of the present invention to provide a hay bale lifter which is easily slid into and secured to a standard square-type trailer hitch which in turn is attached to the frame of a standard half to one-ton pick-up truck.

It is another object of the present invention to provide a hay bale lifter in accordance with the preceding objects which can be installed and operated in an energy-efficient way by a single operator without the use of hydraulic or other motors.

A still further object of the present invention is to utilize this device on flat terrain or on gentle slopes, wherever a conventional pick-up truck can travel.

Another further object of the present invention is to provide a device which can be easily removed from the trailer hitch by a single person and stored in the back of the pick-up truck when not in use, taking up minimal space.

Yet another object of the present invention is achieved by providing a pitch-fork like lifting device, three-pronged in nature, in which the middle spearing bar penetrates the center core of the hay bale and two shorter side spikes are utilized to also penetrate the hay bale in order to stabilize the hay bale from rolling.

Still another object of the present invention is to provide for raising the fork and the hay bale to an approximate 45° angle with the use of a ratchet binder, thereby providing an energy-efficient and environmentally responsible device to meet the needs of farmers and cattlemen in transporting hay bales.

A final object of this invention to be specifically enumerated herein is to provide a round hay bale lifter and transport device in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an exploded, side-elevational view of the lifter and transport device shown in FIG. 2.

FIG. 4 is an exploded, top plan view of the lifter and transport device as shown in FIG. 3.

DETAILED DESCRIPTION OF THE PREFERRED EMBODIMENTS

Figure 1:
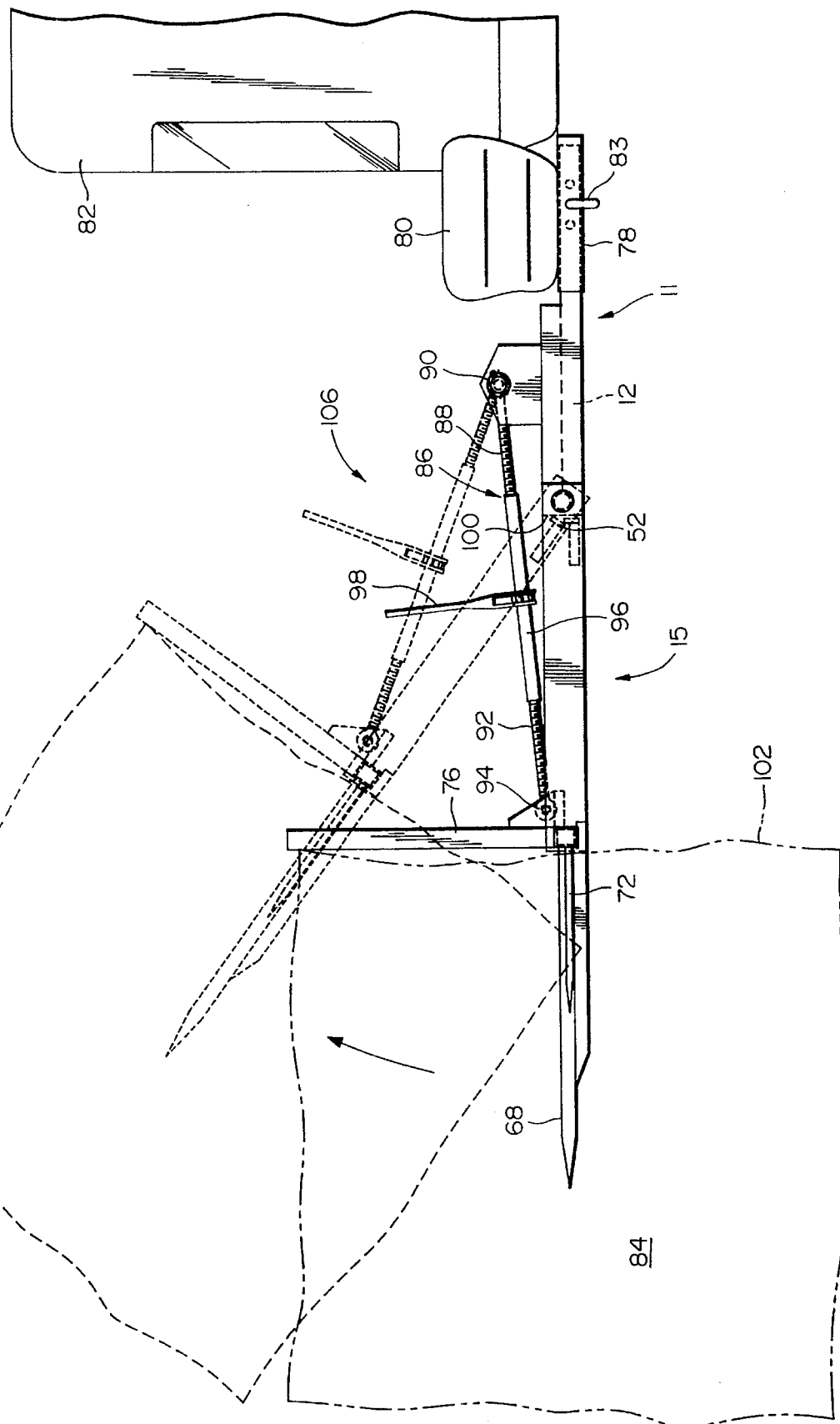
FIG. 1 is a side elevational view of the lifter and transport device of the present invention mounted in a standard square-type trailer hitch secured to the frame of a conventional pick-up truck, penetrating a hay bale. Also illustrated in dotted lines, is the lifting structure in an inclined position used when transporting the bale of hay.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
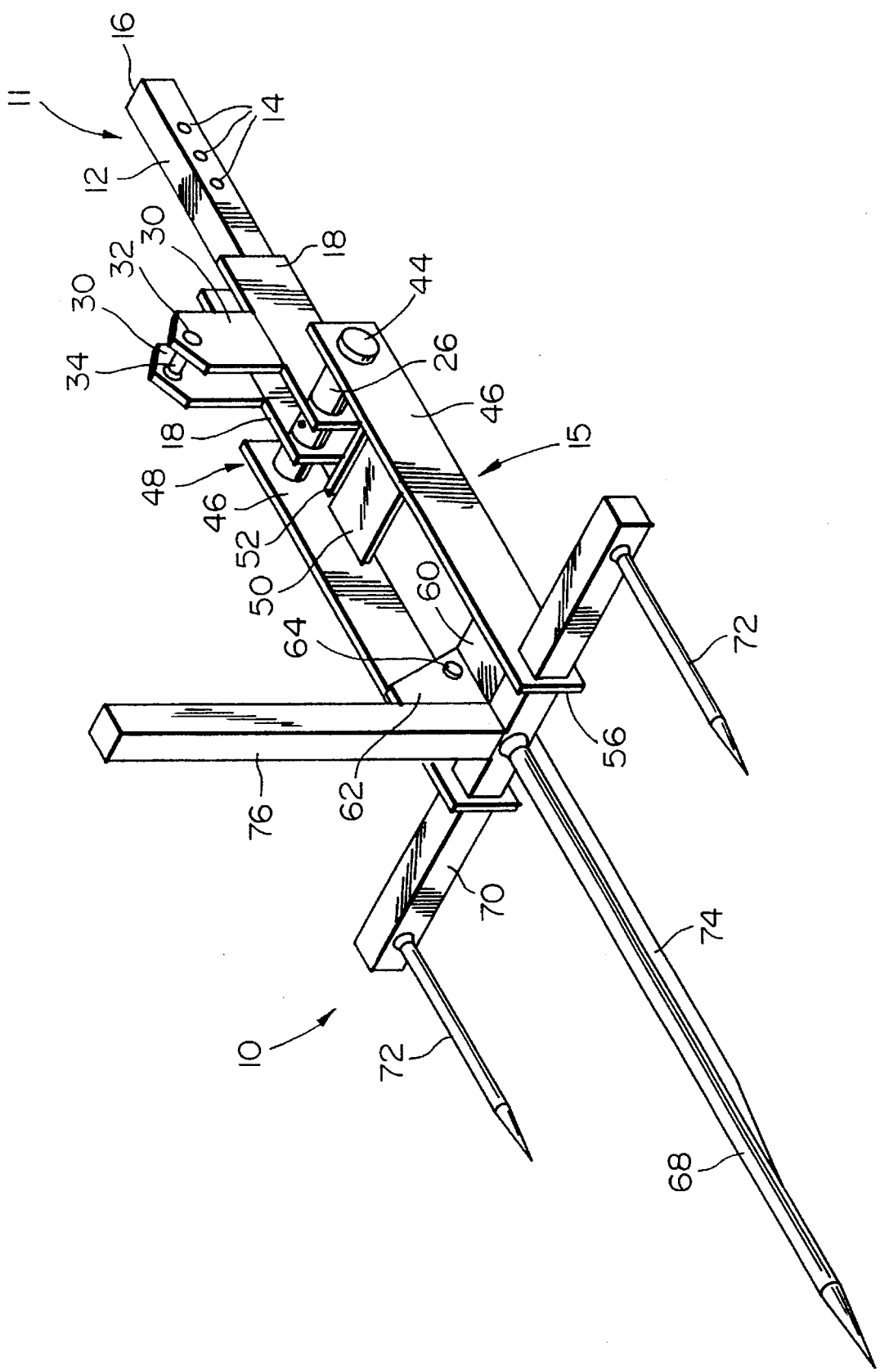
FIG. 2 is a perspective view of the lifter and transport device embodying the principles of the present invention.

With reference to the drawings, in general, and to FIGS. 2 through 4, in particular, the hay bale lifter and transport device embodying the teachings of the present invention is generally designated as 10. The lift device 10 is mounted on a pick-up truck or other conventional vehicle 82 by an anchor structure 11 including a standard heavy wall two inch square steel tube 12. Tube 12 is designed to fit into any standard two inch square trailer hitch that is conventionally mounted to the frame of a pick-up truck or other conventional vehicle. Holes 14 in the mounting end 16 of the tube allow the anchor portion 11 to be adjustably positioned depending on the location of the square trailer hitch on a particular make and model of truck.

Two stabilizer bars 18 are preferably welded along opposite sides of the two inch square tube 12. The ends 22 of the stabilizer bars 18 extend slightly beyond the end 20 of pipe 12. The ends 22 include holes 24, through which is fitted pipe 26 with a grease-fitting 28 located in the center of the pipe. Pipe 26 is preferably welded in holes 24, and serves as the sleeve for a hinge to lift the lifting structure, generally designated by the numeral 15 on the front of the device 10.

Welded to the top of each of the two stabilizing bars 18 is a flange 30. Alternatively, each flange 30 and stabilizing bar 18 can be formed from one piece of steel or the like. Holes 32 near the top of each flange 30 hold pin 34 by washers 35 and cotter pins 36 located exteriorly of the flanges 30. Pin 34 fits through the eye of a ratchet binder which is used to lift the hay bale as will be explained hereinafter with reference to FIG. 1. The pin 34 has two spacers 38 located interiorly of the flanges 30 which ensure the stability of the ratchet binder on the pin 34.

Shaft 42 fits through the pipe 26, with ends 44 extending out from each side of the pipe 26. Shaft 42 is preferably core-roll steel. Each end 44 extends out through holes 45 of lift bars 46 of lift section 47 and is welded onto each of these bars 46. This assembly provides the hinge generally designated as 48 in FIG. 2, for the lifting structure 15. The hinge 48 is lubricated through the grease fitting 28 in pipe 26 by filling with grease or other conventional lubricant the annular gap built in between the pipe 26 and the shaft 42 as closed at its ends by bars 46.

Immediately adjacent to this hinge 48 is a stiffener bar 50 located between and welded to the inside of the two lift bars 46. Welded to this reinforcing bar 50 is a stop-secure bar 52 which prohibits downward movement of the transport device by contact of the bar 52 with the front edges 100 of the bars 18.

The lift bars 46 preferably have square holes 54, on their forward ends 56, through which is fitted and attached a generally horizontal frame support 70 of the hay bale lifter fork assembly generally designated as 58. Support 70 is also preferably made of square steel tubing and is welded in place on both sides of each hole 54. The hay bale lifter 58 and the lift section 47 collectively form the hay bale lifting structure 15 pivotally mounted on the anchoring structure 11.

Welded between the lift bars 46 on their forward end 56, adjacent the square holes 54, is another reinforcing bar 60, and two lift flanges 62 extend upwardly from the bar 60. Holes 64 in each flange 62 receive pin 66 which serves as the other pivotal attachment point for the ratchet binder.

The hay bale lifter fork 58 which will penetrate the hay bale allowing the hay bale to be lifted, includes the horizontal frame support 70 which extends laterally substantially beyond the ends of lift bars 46. Near each end of the tube 70 is a circular hole through which the rear end of an elongated spike 72 is inserted and welded on both the inside and outside of the square tube 70. Spikes 72 are preferably tapered gradually at their forward ends to provide a sharpened point to assist in piercing the hay bale. In the preferred embodiment, spikes 72 are also core-roll steel. Spikes or core-rolls 72 serve as stabilizing spears for a lifted hay bale.

Located in the center of tube 70 is a larger hole, through which the rear end of a correspondingly sized center spear 68, is inserted and welded on both the inner side and the outer side of the square tube 70. Center spear 68 is substantially longer than side spikes 72 and is preferably tapered gradually to a point at its forward end. By being substantially longer, the design of fork 58 assures that the single center spear 68 penetrates the hay bale a substantial distance before contact with side spikes 72, thus guiding the fork into the hay bale to be lifted and transported. In the preferred form, spear 68 is also core-roll steel. Welded on the underside of the center spear 68 is a reinforcing bar 74. Welded on the top surface of the tube 70 adjacent center spear 68 is a generally vertical support bar 76 which serves to support the hay bale on fork 58 in the raised position of the lifting structure 15. Support bar 76 is also preferably made from 2 inch square steel tubing.

In the operation of the lifting and transport device of the present invention, the bar 12 extends or projects into a conventional trailer hitch 78 mounted underneath the bumper 80 of a pick-up truck or other conventional vehicle 82. A locking pin 83 extends through the trailer hitch 78 and into one of the holes 14 of the bar 12. The truck 82 to which the anchor portion 11 of the device 10 of the present invention is now mounted is driven in reverse until at least center spear 68 and preferably also side spikes 72 at least partially extend into a bale of hay 84 laying on the ground. The operator of the truck then manually actuates ratchet binder 86.

The ratchet binder 86, initially positioned as shown in solid lines in FIG. 1, includes a first threaded bar 88 having a yoke 90 at its outer end which is anchored on pin 34 located between flanges 30. At the opposite side of the ratchet binder is a second threaded bar 92 which includes at its outer end a yoke 94 anchored on pin 66 located between flanges 62. Bars 88 and 92 are oppositely threaded. A centrally located, internally threaded sleeve 96 threadingly engages bars 88 and 92. An actuating handle 98 is secured to the threaded tube 96. A preferred ratchet binder suitable for use in the present invention is the Lebus® Load Binder Model R-10.

By continued rotational and reverse rotational movement of the handle 98, utilizing a ratcheting action between handle 98 and its engagement with the sleeve 96, the two bars 88 and 92 are drawn towards each other and into the interior of threaded sleeve 96. As shown in dotted lines in FIG. 1, the movement of the two bars 88 and 92 towards each other causes pivoting of the yokes 90 and 94 about pins 34 and 66, respectively, so that the bars 46 of the lifting structure 15 are pivoted about the hinge 48 into an elevated position with respect to the anchoring structure 11.

The degree of elevation of the lifting fork is limited by the contact of the bar 52 with the front edge 100 of the stabilizer bars 18, preferably about 45°. As the hay bale 84 is lifted, if only partial penetration by the spear 68 and spikes 72 has been achieved, the hay bale will slide, under the force of gravity, further along the spear 68 and spikes 72 until the outer surface 102 of the hay bale engages against vertical support bar 76. In the elevated, inclined position of the hay bale 84, the truck 82 can then be driven to transport the hay bale to a desired location. The operation of lifting the hay bale is reversed for depositing the hay bale at the desired location.

The size and dimensions of the component parts of the hay bale lifter and transport device may vary depending upon many factors of design and manufacture. However, the dimensions for one embodiment are provided hereinafter within normal manufacturing tolerances. The standard heavy wall two inch square steel tube 12 is preferably about 22 inches long with at least three 5/8 inch diameter holes 14. The stabilizer bars 18 are formed from 1/2 inch thick steel stock about 12 inches long and 4 inches wide. Lift bars 46 are made from the same material and have the same dimensions. Holes 24 are 2 1/4 inch in diameter and pipe 26 is 7 inches long, sized to fit in holes 24. Flanges 30 on top of each stabilizing bar 18 are also made from 1/2 inch steel stock, 6 inches high and 4 inches wide. Holes 32 are located about 1 1/4 inches from the top of each flange 30 and pin 34 is 1 inch in diameter. Spacers 38 on pin 34 are each 1/2 inch wide.

The core roll for shaft 42 is 2 inches in diameter and 10 inches long, with ends 44 extending 1 1/2 inches outwardly from each side of pipe 26. Thus, with lift bars 46 made of 1/2 inch steel stock, there is one inch of the core roll end 44 extending outside each of the lift bars 46.

Reinforcing bar 60 is also made from 1/2 inch steel stock and is 4 inches in width. It is located 2 1/2 inches from end 56 of lift bars 46. Flanges 62 are located about 3 inches from the sides of lift bars 46 and are also made from 1/2 inch steel stock, measuring 5 inches in height and 4 inches in width. Holes 64 measure 7/8 inch in diameter, located in the center of each flange, about 1 inch from the bottom and 2 inches from the side edge. Pin 66 is 3 inches long and is fitted and welded in holes 64.

Square frame support 70 is 32 inches long. Spikes 72 are 1 inch in diameter and 16 inches long. Center spear 68 is 1 1/2 inches in diameter and 40 inches long. Reinforcing bar 74 is also made from 1/2 inch steel stock and measures 1 1/2 inches wide and 36 inches long. Support bar 76 is 24 inches in length.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is as follows:

1. A hay bale lifter and transport device comprising:
   an anchoring structure including a projection for quick connect and disconnect fitting to a trailer hitch secured to a truck,
   a hay bale lifting structure pivotally mounted on said anchoring structure, and
   a ratchet binder pivotally mounted between said anchoring structure and said lifting structure for elevating or lowering said lifting structure upon appropriate manual rotation of a threaded sleeve of said ratchet binder.

2. A hay bale lifter and transport device according to claim 1, wherein said projection is a two inch square tubing.

3. A hay bale lifter and transport device according to claim 2, wherein two stabilizing bars are secured on opposite sides of said square tubing and a hinge sleeve extends perpendicular to and through said two stabilizing bars with a core roll secured to said lifting structure extending through said hinge sleeve to form a hinge for relative movement between said anchoring structure and said lifting structure.

4. A hay bale lifter and transport device according to claim 3, wherein said lifting structure includes a stop bar for engaging said two stabilizing bars and limiting further pivotal movement up and down of said lifting structure.

5. A hay bale lifter and transport device according to claim 1, wherein said threaded sleeve engages two oppositely threaded bars pivotally mounted on said anchoring structure and said lifting structure, respectively.

6. A hay bale lifter and transport device according to claim 5, wherein a ratchet handle is mounted on said threaded sleeve for manually rotating said threaded sleeve for elevating or lowering said lifting structure with respect to said anchoring structure.

7. A hay bale lifter and transport device according to claim 1, wherein said lifting structure includes a stop bar for engaging said anchoring structure and limiting further pivotal movement of said lifting structure.

8. A hay bale lifter and transport device according to claim 7, wherein said lifting structure is elevatable to an angle of about 45° with respect to said anchoring structure.

9. A hay bale lifter and transport device according to claim 1, wherein said anchoring structure includes two vertically rising flanges including a pin extending therebetween for pivotally anchoring one end of said ratchet binder.

10. A hay bale lifter and transport device according to claim 9, wherein said lifting structure includes two vertically rising flanges including a pin extending therebetween for pivotally anchoring the other end of said ratchet binder.

11. A device for lifting and transporting a round hay bale, said device comprising:

an anchoring structure having a square tubing for extending into and being secured to a square tube trailer hitch, a lifting structure pivotally mounted on said anchoring structure and including a pronged fork assembly for engaging said hay bale, and a ratchet binder pivotally mounted between said anchoring structure and said lifting structure for elevating said lifting structure, said ratchet binder including a threaded bar pivotally mounted on said anchoring structure at one end and threadingly engaging a threaded sleeve at the other end and another threaded bar pivotally mounted on said lifting structure at one end and threadingly engaging said threaded sleeve at the other end, and a handle mounted on said threaded sleeve for controlled rotation of said threaded sleeve upon manual movement of said handle by rotational and reverse rotational movement of said handle about said threaded sleeve so as to change a position of said hay bale lifting structure with respect to said anchoring structure.

12. A device according to claim 11, wherein a bar on said pronged fork assembly limits penetration of said pronged fork assembly into a hay bale.

13. A device according to claim 11, wherein said pronged fork assembly includes three spears.

14. A device according to claim 11, wherein said anchoring structure and said lifting structure are pivotally mounted to each other by a hinge including a core roll located inside of a tube with a grease fitting located on said tube for filling an annular gap between said core roll and said tube with grease.

15. A device according to claim 11, wherein said lifting structure includes a stop bar for engaging said anchoring structure and limiting further elevation of said lifting structure.

16. A device according to claim 15, wherein said lifting structure is elevatable to an angle of about 45° with respect to said anchoring structure.

17. A device according to claim 11, wherein two stabilizing bars are secured on opposite side of said square tubing and a hinge sleeve extends perpendicular to and through said two stabilizing bars with a core roll secured to said lifting structure extending through said hinge sleeve to form a hinge for relative movement between said anchoring structure and said lifting structure.

18. A device according to claim 17, wherein said lifting structure includes a stop bar for engaging said two stabilizing bars and limiting further elevation or lowering of said lifting structure.

* * * * *